Oct. 4, 1966 E. V. THOMAS 3,276,762

OMNIDIRECTIONAL DAMPED SUPPORT MEMBER

Filed Oct. 28, 1964

INVENTOR.
EDWARD V. THOMAS

BY

ATTY.

United States Patent Office 3,276,762
Patented Oct. 4, 1966

3,276,762
OMNIDIRECTIONAL DAMPED SUPPORT
MEMBER
Edward V. Thomas, Severna Park, Md., assignor to the United States of America as represented by the Secretary of the Navy
Filed Oct. 28, 1964, Ser. No. 407,265
6 Claims. (Cl. 267—1)

The invention described herein may be manufactured and used by or for the Government of the United States of America for governmental purposes without the payment of any royalties thereon or therefor.

The present invention relates to shock and vibration transmission path reduction and more particularly to a laminated mount structure exhibiting a high degree of damping for supporting shipboard machinery, whereby vibrations due to the machinery are reduced in amplitude and not transmitted to the ship's hull and shocks and vibrations from other sources are not transmitted to the machinery.

In the past, machinery mounts have been formed by laminated light weight structures which are inherently weak structurally thereby providing poor support or by adding heavy damping material to structural steel or aluminum which inherently provides poor damping.

The general purpose of the present invention is to provide a strong, light weight highly damped structure without the associated lack of strength normally found in such highly damped structures. To attain this, the present invention contemplates a high strength steel-viscoelastic multi-laminated structure having the center portion transverse to the end portions, whereby great strength is combined with high damping characteristics.

An object of the present invention is the provision of a laminated structure whose configuration exhibits omnidirectional damping.

Another object is to provide a laminated omnidirectional damped mount of light weight and great strength for supporting equipment.

A further object of the invention is the provision of radically higher damping characteristics through torsional shear development for use in high vibratory environments.

Still another object is to provide a high degree of noise attenuation for shipboard equipment.

Figure 1:
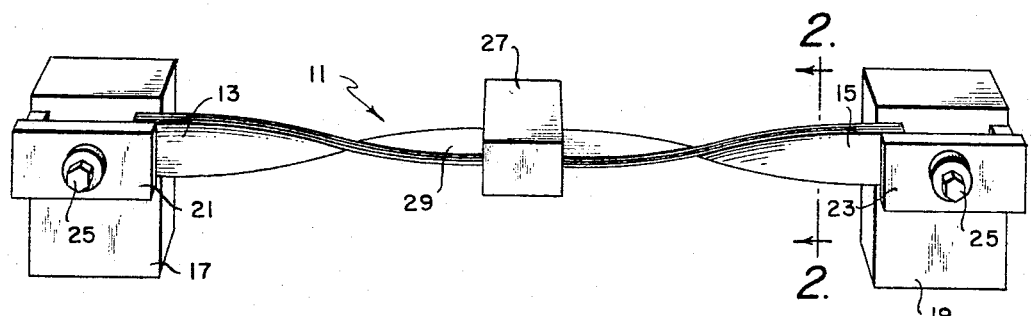
Figure 2:
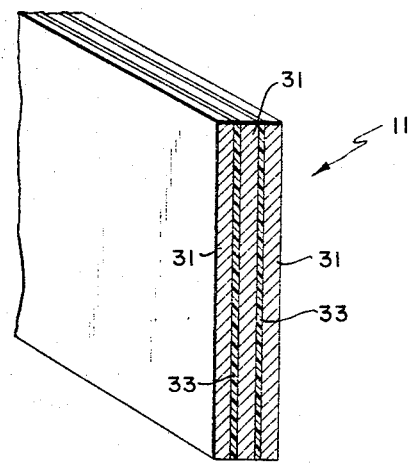

Other objects and many of the attendant advantages of this invention will become readily appreciated as the same becomes better understood by reference to the following detailed description when considered in connection with the accompanying drawings wherein:

FIG. 1 is a perspective view of a laminated mount of the present invention used as a foundation member for a piece of shipboard equipment; and FIG. 2 is an enlarged cross sectional view taken along line 2—2 of FIG. 1 of a laminated mount constructed according to the present invention.

Referring now to the drawings, wherein like reference characters designate like or corresponding parts throughout the several views, there is shown in FIG. 1 a shock and vibration damped mount 11 having its end portions 13 and 15 rigidly clamped to support members 17 and 19 respectively. The mount 11 may be clamped in any suitable manner and is shown in FIG. 1 as being secured to the support members 17 and 19 by clamping plates 21 and 23 which are in turn secured to the support members by a plurality of bolts 25. A load, which may be a piece of machinery or equipment shown conventionally as block 27, is secured to the central portion 29 of mount 11 by any suitable mounting means.

The laminated vibration mount 11 as shown in FIG. 2 comprises a plurality of metal leaves 31, preferably composed of high strength steel. Interspersed between the metal leaves and bonded thereto are high dynamic shear loss tangent viscoelastic material layers 33, i.e., viscoelastic material which exhibits high loss when operating in the non linear portion of the shear curve. This laminate as shown in FIG. 1 is then subjected to torsional forces to displace the central portion 29 through an angle approximately 80 to 90 degrees with either end portion 13 and 15. Care must be taken so as to not put a continuous twist in the member so that the load applied to the mount will not tend to further twist both ends in the direction of pretwist. A force applied to the load 27 will be distributed equally throughout the mount of the present configuration since each end portion 13 and 15 will exhibit approximately the same stresses due to the center portion being transverse to the end portions.

According to the present invention, viscoelastic material layers 33 are interlaminated with leaves of a metal 31 in such manner as to provide improved damping action. These viscoelastics must have the properties of both high dynamic shear loss tangents and sufficient creep characteristics to prevent failure of the viscoelastic, cohesively or adhesively during the pretwist to develop the configuration of the mount. By way of example and not by way of limitation viscoelastic material compounds having the above-mentioned characteristics which may be used in the laminated mount are Marvinol polyvinyl chloride produced by the U.S. Rubber Co., and No. 466 damping tape produced by the Minnesota Mining and Manufacturing Co.

The laminated mount 11 is designed to provide damping in response to omnidirectional forces to previous vibration mounts which are only responsive to forces applied in one direction, i.e., the horizontal or the vertical direction. The mount, due to its configuration provides maximum damping in response to the omnidirectional forces applied to the load in the plane which bisects the mount and is perpendicular to the longitudinal axis of the mount. The mount also provides damping action in response to the forces applied in substantially all directions about the load and thus may be referred to as an omnidirectional damped vibration isolation mount.

The laminated mount provides radically higher damping through torsional shear development to dissipate higher percentages of vibrational energy as heat. The torsional shear development results from the twisting action of the mount when a force is applied to the load. The twisting action causes the steel layers to deform substantially uniformly due to the steel being a rigid material while the viscoelastic material layers being flexible undergo a non-uniform deflection. The torsional loading of the mount 11 increases the damping in the pretwisted laminate by increasing the length of the active shear plane in the viscoelastic material and therefore a greater area of viscoelastic material is deformed and undergoes shear, thereby dissipating a greater amount of vibrational energy as heat. The vibration isolation mounts constructed according to the present invention provide damping characteristics of approximately three times greater than the damping characteristics of prior art vibration mounts. In addition to this high damping, the configuration greatly increases the shock-loading strengths of the mount by causing the shock pulses to be taken primarily as a tensile load on the steel layers. Therefore, the mount utilizes the high tensile strength of the steel layers to support the load and carry the large stresses due to shock without structural failure of the mount.

Thus, it is seen that the vibration isolation mounts constructed according to the present invention provide a high degree of damping, omnidirectional damping and high tensile strength whereby the load supported by the member is protected from vibration and shock and in turn the ship's structure is isolated from vibration amplification caused by the foundation resonances of load generated vibrations, thereby attenuating noise resulting from such vibrations.

Obviously many modifications and variations of the present invention are possible in the light of the above teachings. Contemplated uses of the present invention which are not intended as a limitation to such uses include the use of the present invention as a torsional leaf spring in vehicular suspension systems and use in high vibratory environments in the missile field where shock and vibration are necessary material support considerations. It is therefore to be understood, that within the scope of the appended claims, the invention may be practiced otherwise than as specifically described.

What is claimed is:

1. A laminated support structure for achieving noise attenuation comprising:
    a plurality of flat metal leaves;
    a plurality of viscoelastic material layers interspersed between said leaves and bonded thereto to form a viscoelastic multilaminate support structure;
    said structure having a center portion and two end portions; and
    said structure having a permanent twist about its longitudinal axis so that the center portion is transverse to its end portion, whereby the configuration of the structure provides a high degree of damping in response to omnidirectionally applied forces.

2. A laminated shock and vibration reducing mount according to claim 1 wherein said center portion forms a mounting seat for a device.

3. A laminated mount according to claim 1 wherein the angle through which said center portion is twisted lies between 80° and 90° with respect to either end portion.

4. A laminated mount according to claim 1 wherein said plurality of metal leaves are composed of high strength steel, thereby adding great strength to the light weight structure.

5. A laminated mount according to claim 1 wherein said viscoelastic material layers have the properties of high dynamic shear loss tangents and sufficient creep characteristics to prevent failure of the viscoelastic during the pretwist.

6. A twisted laminated omnidirectional shock and vibration reducing mount comprising:
    a plurality of high strength steel leaves;
    a plurality of viscoelastic material layers interspersed between said leaves and bonded thereto to form a viscoelastic multilaminate support structure;
    said viscoelastic material layers having the properties of high dynamic shear loss tangents and sufficient creep characteristics to prevent failure of the viscoelastic during the pretwist;
    said structure having a center portion and two end portions;
    said structure having its center portion twisted through an angle in the range of 80° to 90° with respect to either end portion;
    whereby the twisted configuration of the structure provides a high degree of damping in response to omnidirectionally applied forces.

References Cited by the Examiner
UNITED STATES PATENTS

| 2,786,670 | 3/1957 | Hammond | 267—57 |
| 3,022,536 | 2/1962 | Floehr | 267—57 X |

FOREIGN PATENTS

| 1,183,314 | 1/1959 | France. |

ARTHUR L. LA POINT, *Primary Examiner.*

R. M. WOHLFARTH, *Assistant Examiner.*